Aug. 3, 1937.   J. H. BUCKNAM ET AL   2,089,014
METHOD AND APPARATUS FOR WELDING AND CUTTING
Filed June 8, 1931   3 Sheets-Sheet 1

INVENTORS:
James H. Bucknam,
Lloyd W. Young,
BY   ATTORNEYS
Byrnes Townsend & Potter.

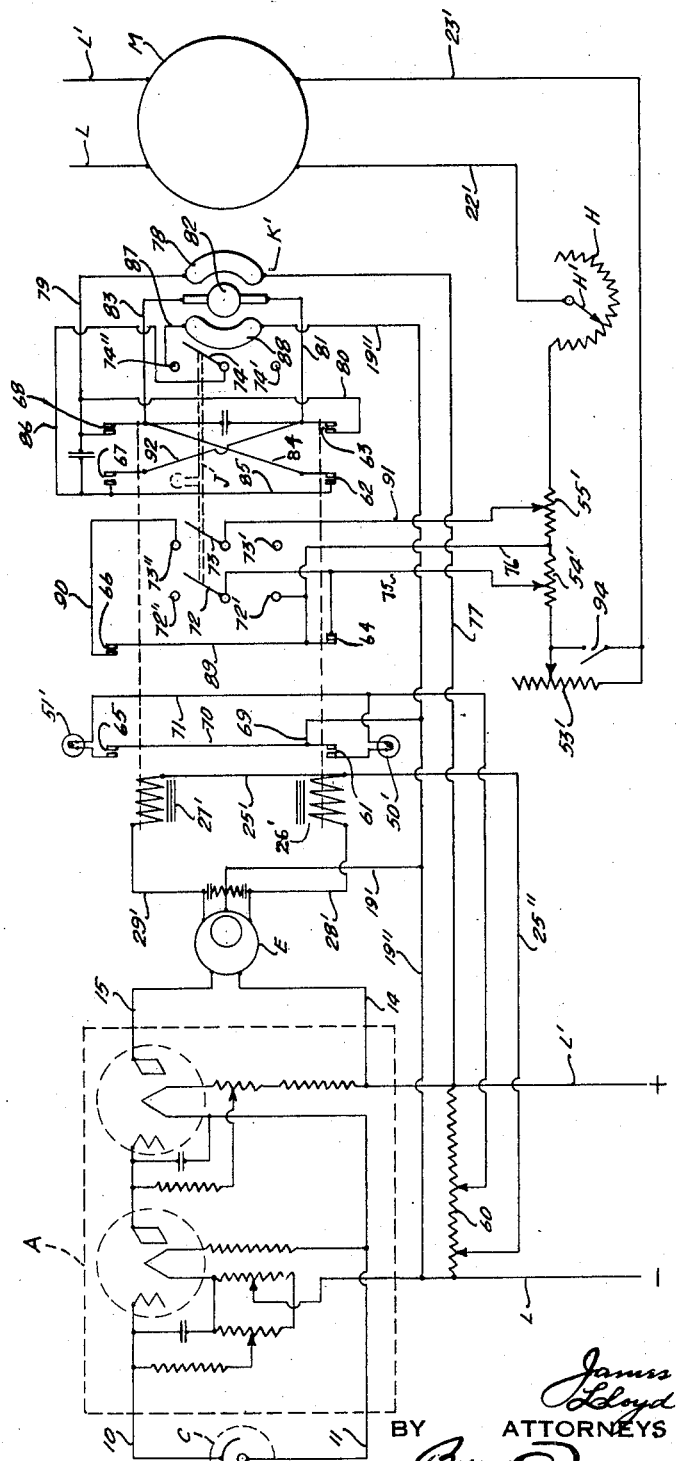

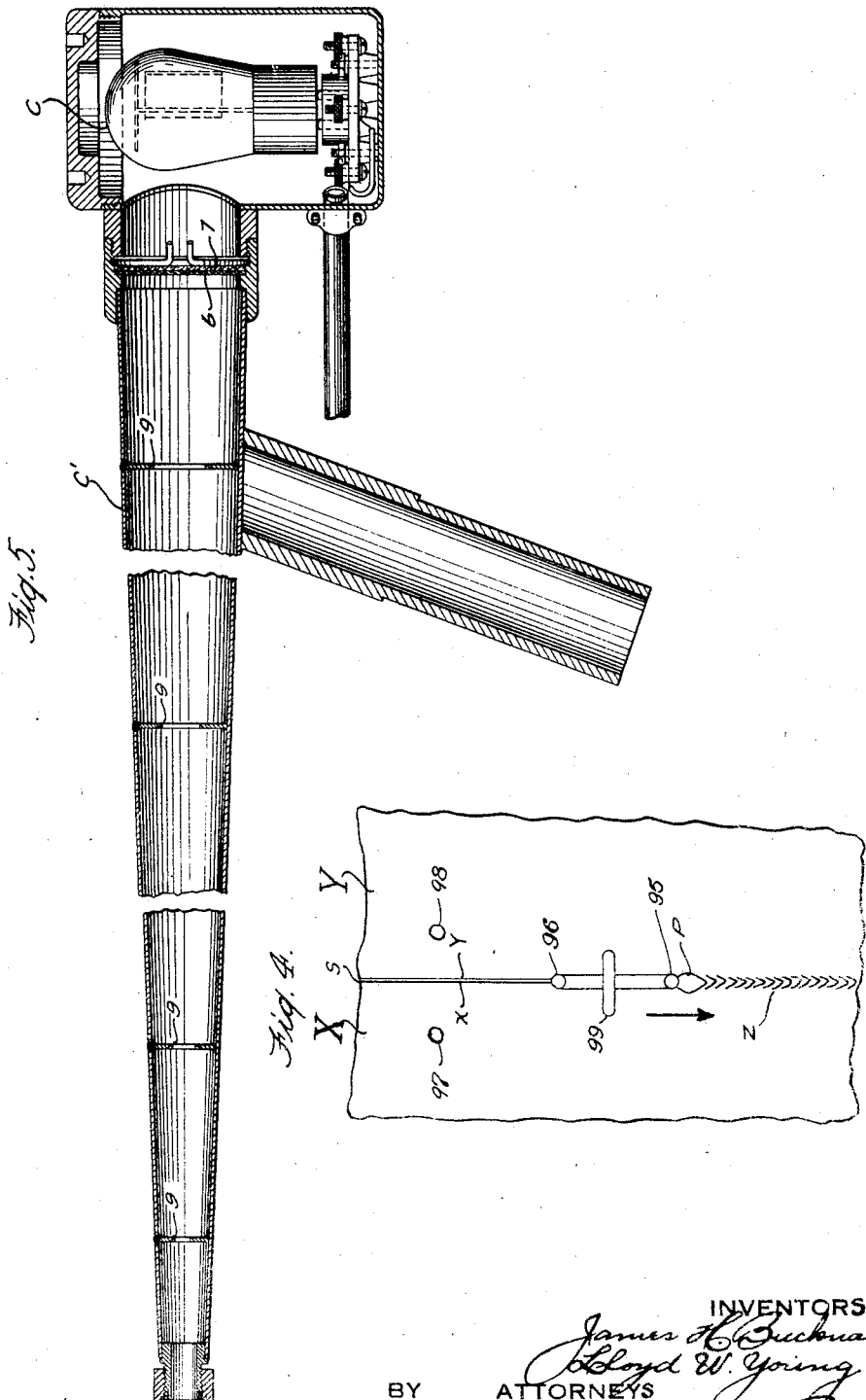

Patented Aug. 3, 1937

2,089,014

UNITED STATES PATENT OFFICE 2,089,014

METHOD AND APPARATUS FOR WELDING AND CUTTING

James H. Bucknam and Lloyd W. Young, Buffalo, N. Y., assignors, by mesne assignments, to Union Carbide and Carbon Corporation, a corporation of New York Application June 8, 1931, Serial No. 542,963

38 Claims. (Cl. 113—59)

This invention relates to the art of welding and cutting metals, and more particularly to systems operable automatically or semi-automatically to continuously produce a weld or cut of uniformly excellent quality.

In the fusion welding of metals by means of the oxyacetylene flame or the electric arc, as in production or machine welding, the weld produced is the resultant of a number of variable factors such as: the welding heat of the flame or the arc; the speed at which the work is fed relatively to the flame or arc; the chemical and metallurgical properties of the metal; the width of the gap between the edges being welded; and, when metal is to be fused and added to the seam, the rate at which a welding rod or a welding electrode is fed into the molten puddle, as well as the size and the properties of such rod or electrode. In order to produce a welded seam of predetermined high quality it is essential that these factors be very accurately correlated at every point along the seam.

Heretofore, in most types of automatic welding machines, the work-feeding speed and the heat are set at a predetermined standard at the start of a weld and are not changed during its progress. Hence, since the factors which contribute to produce the weld usually do not remain constant, unsatisfactory welds often result. In some welding machines, to compensate for such variations, the welding speed has been changed by an attendant whose manipulations are determined by his own judgment of the appearance of the weld, the welding heat, and other factors, while the weld is being made. When he concludes that a satisfactory weld is not being produced, the attendant again relies upon his judgment, making adjustments of the welding speed, the heating means, the welding rod feed, and so forth, in his effort to compensate for a change in one or more of these, hoping thereto to reestablish the combined condition that produces a weld of the required quality. There has been no definite relation between the attendant's adjustments and the predetermined welding conditions they aim to restore. Each attendant thus introduces a personal variable factor into the welding done by a machine under his care, because his control and manipulation depend mainly upon his acuteness and skill, which usually wane during the working day. Under these conditions it has been practically impossible to maintain a satisfactory correlation of all of the variable factors entering into a seam welding operation throughout its progress from the beginning to the end of a welded seam.

According to the present invention, human skill and judgment may be substantially eliminated from the welding operation and replaced by a control mechanism which constantly tends to restore the normal welding operation and is instantaneously sensitive and responsive to even the slightest changes in the various factors which cooperate to produce a weld of predetermined penetration and quality. We have determined that one dependable criterion of a substantially perfect weld is the condition of the highly heated or slightly melted metal edges immediately ahead of the welding point, or the condition of the weld at the time it is being produced and in a state of fusion; and that the radiant energy emitted by such highly-heated edges or such molten metal is one of the characteristics which may be utilized in maintaining the desired accurate correlation of the factors producing the condition that results in a substantially perfect weld. We find that a photoelectric cell, when focused on the highly-heated or fused metal adjacent to or at the welding point, may be employed as a medium for instantaneously detecting changes in the welding zone above or below a predetermined normal condition; and that invisible as well as visible light and heat effects of such changes, (luminous and non-luminous energy radiations), too minute to be discerned by an attendant, will instantaneously produce corresponding variations in a predetermined normal photoelectric current. These variations, with or without amplification, may be utilized to control the welding mechanism and reestablish a predetermined normal welding condition. In practice we prefer to control the welding operation by automatically or semi-automatically varying the speed at which the work is moved relatively to the welding means, i. e. the oxy-acetylene flame or the electric arc with or without a welding rod or welding electrode. This speed as well as the welding heat and other factors are adjusted at the beginning of the welding operation to produce a weld of predetermined high quality and correct penetration, after which the mechanism under the control of the photocell may be automatically or semi-automatically maintained in a condition to continuously produce the same result throughout the length of the seam.

A more detailed disclosure of the objects and novel features of our invention will be found in the following description and in the accompanying drawings, in which Fig. 1 is a diagrammatic view illustrating a welding apparatus embodying our invention;

Figs. 2 and 3 are diagrammatic views illustrating modifications of the control system shown in Fig. 1;

Fig. 4 is a view diagrammatically illustrating a portion of a seam that is being welded;

Fig. 5 is a view of the photocell unit with the focusing tube shown in section.

Figure 1:
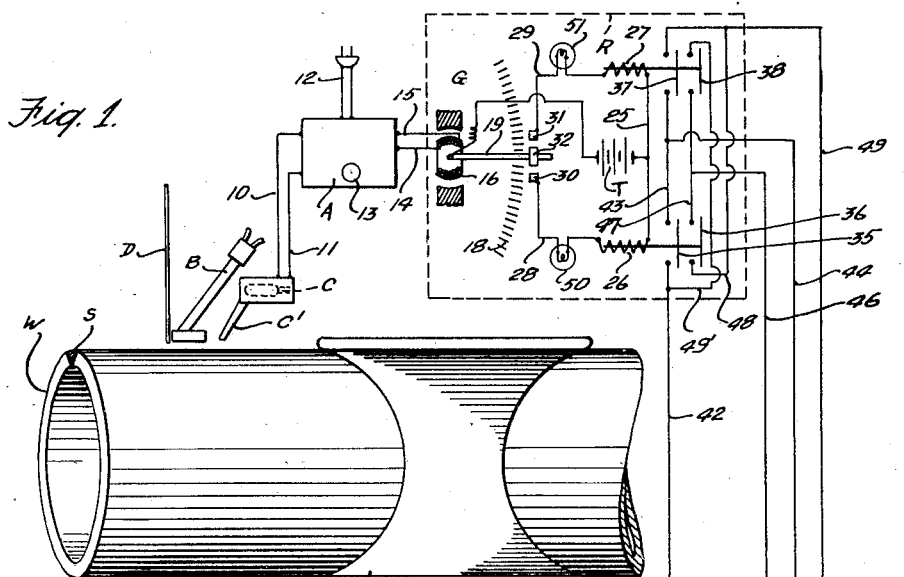

Referring to Fig. 1, we have shown the principles of our invention applied to an apparatus for welding the longitudinal seam S of a tubular metal article such as a steel barrel or pipe W. An oxy-acetylene or similar blowpipe B, or an electric arc, may furnish the high temperature heat required to heat and fuse the edges to be united and to fuse a welding rod D, if weld metal is to be added to form the joint. The welding rod may serve as the current-carrying electrode when the electric arc is used; and such rod or electrode, as the end thereof melts off, may be fed to the welding zone by well-known mechanism (not shown). The work, such as the contiguous edges of the seam, may be progressively heated, as by moving the work and the heating medium or flame relatively to one another in a direction lengthwise of the seam to produce a continuous weld. As here shown, suitable feed rolls F, driven through appropriate gearing by a variable speed electric motor M, may engage opposite sides of the barrel W and propel the same so that the seam thereof will move past the relatively stationary blowpipe and the welding rod associated therewith.

In an effort to produce a satisfactory weld throughout the length of the seam, an attendant has heretofore manually regulated the feed of the work relatively to the heating means; as for example, by turning the handle H' of a rheostat H in the motor field circuit to the right or to the left to increase or to decrease the speed of the motor M and thereby correspondingly vary the movement of the seam relatively to the heating means. In making these adjustments, the attendant is guided principally by the appearance of the weld, which therefore requires constant watching. This has its physical limitations: he cannot detect minor changes, nor the more pronounced changes immediately at their beginning; and there is always a noticeable interval, sufficient for a weld defect to develop, before corrective regulation is made. Moreover, such regulation is only approximate since there is no definite relation between the changes occurring in the weld and the corrective measures applied by the attendant to reestablish the initial condition.

In order to overcome these difficulties and to produce a continuous uniform weld of predetermined quality, we employ means variable proportionally and instantaneously in response to changes in a characteristic of the molten weld or of the highly-heated base metal adjacent thereto, and utilize such variations to actuate mechanism adapted to reestablish a condition that will insure welding of uniform quality at every point along the seam. Among the mediums adapted to detect and respond to these changes, we prefer to use a photoelectric cell which reacts to changes in the radiant energy emitted by the highly heated or melted metal at or adjacent to the welding point. As shown, such a photocell C is arranged so that it may be focused on the highly heated metal and is preferably connected in circuit with a standard thermionic amplifier A. The output current of the amplifier A may be delivered to a relay R that controls the circuit of a relatively small reversible electric motor K mechanically connected to the rheostat H, which is adapted to cut resistance into or out of the field circuit of the variable-speed drive motor M and thereby increase or decrease the feeding speed of the work W.

As heat is applied to make a weld in steel, the color of the steel changes from black, through the reds to almost a white at the melting point. As the temperature of the steel increases, red and infra-red rays are given off in increasing amounts; and, inasmuch as we may use a photocell that is very sensitive to the radiant energy corresponding to the red and infra-red zones of the spectrum, very slight changes in the condition at the weld may be instantaneously detected by such cell. The changes in the radiant energy conveyed from the work through the tube C' to the photocell C produce a proportional increase or decrease in the electrical energy passing through the cell. Sometimes particles of scale and other matter in the welding zone become highly luminous and emit a bright white light and possibly some ultra-violet light which may give a false signal to the photocell. To overcome this a filter screen may be placed in the tube C' adjacent to the photocell to permit only red and infra-red rays to pass to the cell, thus increasing its stability and working the cell more on heat rays than on light rays. This screen, as shown in Fig. 5, may be made of two pieces of glass, one clear glass 6 ground on one side to diffuse the rays going to the photocell, and the other of clear red glass 7 which screens out the short rays, including the ultra-violet. We may also insert a series of fixed diaphragms 9 in the light conveyor tube C' to prevent reflection from the walls of this tube.

Conductors 10 and 11 electrically connect the photocell C to the input terminals of a suitable direct current amplifying unit A, such as a Loftin-White, which may have a filament-current supply connection 12 and an amplification control knob 13. The amplified electrical energy may be delivered by the conductors 14 and 15 to the coil 16 of a milliammeter G, where the changes in radiant energy corresponding to variations in the weld may be electrically indicated on a scale 18 by a pointer 19 that is actuated by the coil 16.

When beginning the welding operation at one end of the seam, the several factors such as the blowpipe or the electric arc, the feeding speed of the work, and the feeding speed of the welding rod or electrode, are desirably adjusted in accord with previous experience and standards so as to cooperate in producing a weld at that point which has predetermined high quality and normal penetration. The circuit connections of the photocell and amplifier having been completed by appropriate switches, the photocell will be energized by the light flux from the molten weld upon which it is focused, whereupon as the welding progresses the milliammeter pointer 19 will indicate on the scale 18 any changes from the initial conditions; or the milliammeter may be so calibrated that the desired initial condition will be indicated at the beginning of the welding operation when the pointer 19 is located at a predetermined reading on the scale 18.

Since the effects of the several welding factors are integrated in the weld, one of these factors such as the work-feeding speed may be regulated in response to variations in the initial or desired condition of the weld, to produce a uniform weld throughout the length of the seam even though variations may arise from time to time in the other cooperating factors of the welding operation. Hence, to semi-automatically control the welding, an attendant may observe the movements of the pointer 19 and, guided thereby, may maintain the predetermined welding condition by manually turning the rheostat handle H' to the right or to the left, depending upon successive positions of the pointer 19 relative to a fixed zero point or predetermined reading on the scale 18. This will increase or decrease the resistance in the motor field circuit and thereby increase or decrease the speed of the drive motor M, which has its field circuit connected to the resistance of the rheostat H by conductors 22, 23. Accordingly, when the light flux from the weld to the photocell decreases, the electrical output of the cell is decreased, causing the pointer 19 to move to one side of its predetermined or neutral position. From this the attendant concludes that the welding speed is too fast and thereupon operates the rheostat H to reduce the speed of the drive motor M to a point where the temperature at the weld has the opportunity to become sufficiently high to move the pointer back to its neutral position. Conversely, when the emitted light rays increase to an extent to cause the pointer 19 to move to the other side of its neutral position, the attendant concludes that the work is moving too slowly and accordingly operates the rheostat H to increase the work-feeding speed until the pointer is restored to its neutral position. With such a control, welding speeds can be readily obtained which will at all times result in a fully penetrated high quality uniform weld.

In order to entirely eliminate manual control we prefer to arrange the control system so that the speed of the drive motor M shall be automatically regulated in accordance with the variations in the weld, and we have therefore shown, in Fig. 1, a system whereby the contactor of the rheostat H may be turned in either direction by a reversible motor K that is controlled by the light changes detected by the photocell C. For example, the pointer 19 which responds to the amplified current variations in the photocell may be electrically connected through a battery T to an intermediate point of a conductor 25 that has its opposite ends connected to the solenoid coils 26 and 27 respectively. The other ends of these coils are connected by conductors 28 and 29 to contacts 30 and 31 on opposite sides of and alternatively engageable by a contact 32 on the pointer 19. When the welding is progressing according to the predetermined standard, the pointer will be in its neutral position and the contact 32 will be out of engagement with both contacts 30 and 31; and the distances separating the pointer contact from the other two may be such that infinitesimal variations will be ineffective to close the circuits they control. But when the pointer contact 32 engages the contact 30, the coil 26 will be energized by current from the battery T; and the coil 27 will be similarly energized when the contact 31 is engaged by the pointer contact 32.

These coils 26 and 27, when energized, operate switch mechanism designed to effect the reversal of the armature current of the control motor K and thereby cause a clockwise or a counterclockwise rotation of its armature shaft which may carry a worm 33 that meshes with a worm-wheel 34 carrying a contactor of rheostat H.

The coil 26 simultaneously operates switches 35 and 36 adapted to electrically connect the field winding and the armature winding of the control motor K in circuit with the current supply mains L, L', to cause the shaft of this motor to rotate clockwise; and the coil 27 similarly operates switches 37 and 38 to electrically connect the field and armature windings with the mains L, L' to cause a counterclockwise rotation of the motor armature shaft. The worm 33 on this shaft constantly meshes with the worm-wheel 34 carrying a contactor in the rheostat H, whereby the resistance in the field circuit of the drive motor M may be either increased or decreased by the rotation of the motor K, to either increase or decrease the drive motor speed and the work-feeding speed as required.

Normally the pointer 19 is in its neutral or midposition, the coil circuits are open, the motor K is idle, and the motor M is feeding the work W at the correct speed to produce a weld of predetermined quality. Assuming that the pointer contact 32 engages the contact 30, the switches 35 and 36 will close and current will flow through the following path: Supply main L, conductor 40, field winding 41, conductor 42, switch 35, conductors 43 and 44, armature 45, conductors 46 and 47, switch 36, conductors 48 and 49, supply main L'. Similarly, assuming that the pointer contact engages the contact 31, the switches 37 and 38 will close and current will flow through the following path: Supply main L, conductor 40, field winding 41, conductors 42 and 49', switch 38, conductors 47 and 46, armature 45, conductors 44 and 43, switch 37, conductor 49, supply main L'. The branches of the relay circuit containing the coils 26 and 27 may include differently colored incandescent lamps 50 and 51, one or the other of which will light when the motor K is running and serve as a signal whereby the attendant may instantly learn whether the work-feeding mechanism is being accelerated or retarded.

Figure 2:
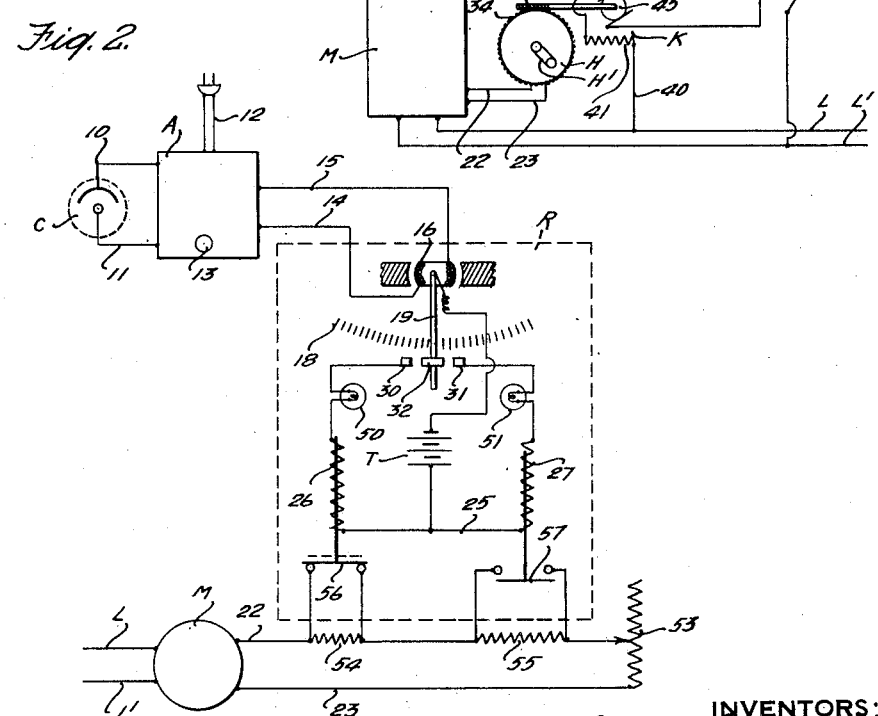

The control system disclosed in Fig. 2 is similar in most respects to the one shown in Fig. 1. Here, the control motor K and its associated connections are omitted and, instead, the coils 26 and 27 in the relay circuit controlled by the pointer contact 32 are arranged to directly open or close switches to instantly increase or decrease resistance in the drive motor field circuit. As shown, the field leads 22, 23 of the drive motor M may include in series therewith a main adjustable resistance 53 and two fixed resistances 54 and 55. Normally the resistance 54 is cut out and the resistance 53 is so adjusted that the motor M will run at the proper speed to feed the work W at the rate required to produce a perfect weld at the beginning of the welding operation. As the welding proceeds, when a condition arises which results in overheating the metal at the weld, the resulting increase in radiant energy, as in light intensity or color, will be detected by the photocell C and the increase in the amplified electrical energy from the latter will operate the pointer 19 to close the contacts 32 and 30, whereupon the energized coil 26 will open the switch 56 to insert the resistance 54 and thereby increase the motor speed sufficiently to restore the initial condition or to establish a condition which will produce a weld of normal penetration and quality at every point. On the other hand, should the radiant energy from the metal at the weld fall below the normal, indicating underheating, then the photocell current will drop and the amplified electric current in the milliammeter winding will operate the pointer 19 to open the contacts 30 and 32 and thereupon the deenergized coil 26 will release the switch 56 to cut out the resistance 54; and if the underheating continues the contacts 32 and 31 will close and the energized coil 27 will close the switch 57 to cut out the resistance 55 and thereby further reduce the drive motor speed sufficiently to restore the initial condition. If the work-feeding speed gets too low and as the radiant energy from the melted metal increases, the contacts 32 and 31 will separate and the switch 57 will release to reinsert the resistance 55 and thereby instantaneously increase the work-feeding speed.

The control system disclosed in Fig. 3 is substantially a combination of the two systems illustrated in Figs. 1 and 2, and affords certain advantages over either of them alone in that a small amount of speed change may be obtained instantly, after which the speed change may be continued if necessary until no further change is called for by the photocell. Here, the photocell C, focused on the welding zone as before, is connected to an amplifier A which may receive its current supply from the 220 volt direct current supply mains L, L'; and the amplifier output terminals may be connected to a suitable relay E as already described, the one shown being of a type known as a Weston Model 534 having contacts, an indicating scale and a pointer similar to those diagrammatically shown in Figs. 1 and 2. The current to energize the relay coils 26', 27' may be derived from the mains L, L' through conductors 19', 19'' and conductors 25', 25''; the conductor 25'' being connected to the main L' through a major part of a high resistance 60. When the coil 26' is energized, the normally open contacts 61, 62, 63 will close and the normally closed contact 64 will open; and when the coil 27' is energized, the normally open contacts 65, 66, 67, 68, will close. When either of contacts 61 and 65 is closed, either green lamp 50' or red lamp 51' will light by current supplied from the mains L, L' by conductors 19'', 69, 70 and 71; so that an attendant may manually turn the rheostat handle H' to semi-automatically raise or lower the speed of the drive motor M, depending upon which lamp is lighted. For this purpose, the three blades 72, 73, 74 of a 2-position switch J are set to engage contacts 72', 73', 74', respectively; but when the control is to be fully automatic the switch J is set so that its blades engage the contacts 72'', 73'', 74'', respectively. Normally an adjustable resistance 54' is cut out of the field circuit of motor M by conductors 75, 76 connected to the normally closed contacts 64; and an adjustable resistance 55' is normally in said field circuit. When the switch J is set for full automatic operation and coil 26' becomes energized, contacts 64 will open and instantly insert resistance 54', thereby effecting an immediate increase in the feeding speed of the work. At the same time, contacts 62 and 63 close and complete the circuit of control motor K' by the following path: Main L', conductor 77, field winding 78, conductors 79 and 80, contacts 63, conductor 81, armature 82, conductors 83 and 84, contacts 62, conductors 85 and 86, blade 74, conductor 87, field winding 88, conductor 19'', main L. The shaft of armature 82, being connected to the handle H', turns the latter in a counterclockwise direction to increase the rheostat resistance until normal welding is reestablished and the increased photoelectric current causes the pointer of relay E to open the circuit of coil 26', whereupon contacts 61, 64, 62, 63 restore to their normal positions. When coil 27' becomes energized, contacts 66 close to instantly cut out the resistance 55' by a shunt consisting of conductors 76, 89, contacts 66, conductor 90, blade 73, and conductor 91; thereby effecting an immediate decrease in the feeding speed of the work. At the same time, contacts 67 and 68 close and complete the circuit of auxiliary motor K' by the following path: Main L', conductor 77, field winding 78, conductor 79, contacts 68, conductor 83, armature 82, conductors 81 and 92, contacts 67, conductor 86, blade 74, conductor 87, field winding 88, conductor 19'', main L. Armature 82 then rotates in a clockwise direction, adjusting contactor H' to cut out rheostat resistance until normal welding is reestablished and the decreased photocell current causes pointer 19 to open contacts 32, 31 (as in Figs. 1 and 2) and deenergizes relay coil 27', whereupon contacts 65, 66, 67 and 68 restore to open positions. An adjustable resistance 53' may be automatically inserted in the driving motor field circuit by mechanism which opens a normally closed switch 94 at the proper time near the tail ends of a weld, so that the driving motor will quickly increase the work-feeding speed and compensate for the rapid building up of heat and overheating at such ends.

While it is practicable and advantageous to focus a photocell on the molten weld metal puddle and thereby instantaneously regulate the welding speed in accord with changes in the radiant energy or the light intensity or color of the puddle, we have found that in multiple flame welding, wherein a series of heating jets may be successively applied to and along the edges to be welded, greater radiant energy changes occur a short distance ahead of the puddle. For this reason, in many instances it is preferable to focus the photocell upon a highly heated part of the metal edges a short distance ahead of the molten puddle, which part for convenience may be called the "guide point". For example, when machine welding a seam between thin sheet metal edges, using a multiple flame oxyacetylene blowpipe, the welding flame which acts on the puddle produces a correctly penetrated weld when the successive heating flames are so arranged that the so-called rear preheating flame slightly melts the edges a short distance ahead of the welding flame. This rear preheating flame may be termed the "guide flame", and the "guide point" upon which the photocell is focused is preferably the slightly molten region along the seam immediately after the latter passes the "guide flame". When the photocell is properly focused on the "guide point", relatively great changes in radiant energy intensity are produced by the narrowing or widening of the molten metal zone at such point, which changes may be utilized in the control systems shown in Figs. 1, 2 and 3 to regulate the work-feeding speed. Hence, when the "guide flame" does not melt the sheet edges, the indications at the "guide point" are that the metal edges have not been sufficiently heated to permit the welding flame to produce a normal or fully penetrated weld, therefore the photocell instantaneously causes the work-feeding speed to be retarded until the desired preheated condition is obtained; on the other hand, when there is too much melting by the "guide flame", the "guide point" indicates that the final weld will carry excessive weld penetration and the control system thereupon instantaneously responds to accelerate the work-feeding speed.

The procedure just described is diagrammatically illustrated in Fig. 4, wherein a weld of the preferred normal penetration is represented in process of formation. The edges $x$, $y$, of the metal plate, pipe or similar sections X, Y, are disposed in abutting or slightly separated relation to provide the seam S to be welded. The finished part of the weld is shown at Z and the molten puddle at P. The number of oxyacetylene flames applied to the seam by the multiple flame blowpipe may vary; as shown, a welding flame 95 may play directly onto the puddle, a rear preheating or guide flame 96 may slightly melt the unwelded edges a short distance away from the puddle, and a pair of forward preheating flames 97 and 98 may apply heat to the unwelded edges a short distance back from the seam and before such edges pass under the guide flame. As indicated at 99, the photocell focusing tube may have an elongated aperture which extends across the seam at the guide point between the flames 95 and 96 to receive radiant energy from the slightly molten edges and the highly heated adjoining metal and transmit such light to the photocell. The blowpipe producing the flames 95, 96, 97, 98 and the focusing tube having the aperture 99 may be stationary, while the work sections X and Y may be fed together lengthwise of the seam, as indicated by the arrow; whereupon the photocell and its associated mechanism, as disclosed in Figs. 1, 2 and 3 will semi-automatically or automatically regulate the work-feeding speed to produce a uniform continuous weld.

It will appear from the foregoing that the production of a uniform continuous weld may be accomplished by appropriately varying the amount of heat supplied to the seam in forming the weld, as by varying the movement of the blowpipe and the work relatively to one another while using a constant heat supply means; and in the advantageous procedure disclosed in detail the work-feeding speed may be varied while the blowpipe is stationary. On the other hand, if the work-feeding speed is kept practically constant, excellent results may be obtained by either varying the pressures of the gases being supplied to the blowpipe and thus varying the size of the blowpipe flames, or by varying the distance between the work and the blowpipe flame, in both of which instances the amount of heat applied to the seam is regulated, of course, in accordance with the variations in radiant energy emitted by the heated work and detected by a photo-electric cell.

The control mechanism for varying the pressures of the gases while the work-feeding speed remains constant may include a photocell focused on the heated metal, an amplifying unit and a contact milliammeter as already disclosed, together with suitable electrically-operated relays or solenoids such as those shown at 26 and 27 which either open or close valves controlling orifices in the gas supply conduits to deliver oxygen and acetylene to the blowpipe at a controlled rate and thereby provide either larger or smaller welding flames and thus either increase or decrease the quantity of heat supplied to the seam by the blowpipe in accordance with the variations in radiant energy emitted by the heated metal.

To vary the distance between the blowpipe flame and the seam being welded and thereby control the weld quality while the work-feeding speed and the pressures of the gases remain constant, we may adjust the blowpipe toward and away from the work onto which it is directed, as the emission of radiant energy from the heated metal varies. This may be accomplished by control mechanism similar to that already described in detail and may include a photocell focused upon the heated metal, an amplifying unit, a contact milliammeter and a reversible electric motor, the direction of rotation of which may be controlled by suitable relays in circuit with the milliammeter contacts. The reversible motor may be connected by suitable means such as worm gearing to a device for either raising or lowering the blowpipe and its flame relatively to the passing work. When radiant energy transmitted from the heated work to the photocell indicates that the weld is being overheated, the mechanism is actuated to automatically move the blowpipe away from the work to reduce its heating effect; and if this radiant energy through the photocell indicates that the weld is underheated, the mechanism will automatically move the blowpipe closer to the work to increase the applied heat.

It is also within the scope of our invention to employ combinations of the methods and mechanisms already described, that is to say, we may vary the work-feeding speed and at the same time also vary the pressures of the welding gases or the distance between the blowpipe and the work. For example, relay-controlled fixed resistances similar to those shown at 54, 55 and 54', 55', when inserted or cut out, may rapidly change the speed of the main work-feeding motor M, and a relay-controlled auxiliary motor may simultaneously actuate mechanism to adjust the blowpipe and its flame either toward or away from the work to obtain gradual changes in the welding heat supplied to the weld. Such a combination is desirable where a relatively large change in heat should be made gradually yet quicker than can conveniently be done by moving the control rheostat H of the main driving motor.

We have disclosed in detail several embodiments of our invention for the purpose of illustrating its broad principles. These principles, while particularly advantageous in fusion welding, may also be employed in uniting metals by brazing and silver soldering; in so-called forge welding wherein, for example, skelp heated in a furnace to a welding temperature may be drawn or fed through a suitable die or pressure-applying means and butt-welded or lap-welded, with or without supplemental heating at or near the welding point; in cutting materials, such as so-called metal cutting with the oxy-acetylene cutting flame consisting of gaseous heating and oxidizing jets; and in heat treating metals, as for example, in controlling the feed of a rod or wire past heating means or through an annealing furnace, the photocell of the feed or heat control mechanism in each instance being focused on the highly heated metal undergoing treatment. The source of heat employed for these purposes may be either a gaseous heating flame or an electric heating current or both. The photocell or radiant energy responsive means, instead of being focused on or applied to the outside of the work as shown in Fig. 1, may be focused on the bottom or inner side of the seam adjacent the welding point; the light conveyor tube C being suitably supported inside the tube W and directed on a highly heated zone on the opposite side of the seam from that to which the heating flame or arc is applied, the conduction of heat through the metal wall of the tube W serving to intensely heat such inner zone. The aperture of the conveyor tube may be of a shape which exposes both the guide point and part of the weld puddle to the photocell, and the latter may receive radiant energy either directly or through a system of prisms. While we prefer to automatically or semi-automatically regulate the operations disclosed by means of the well-known bulb type photocell, we may use the selenium cell instead; and in place of these we may use a device, such as an electrical pyrometer, which is responsive to changes in the temperature of the molten weld metal. Moreover, the type of amplifier and the system of relays and resistances as shown in Figs. 1 and 2 may be eliminated by connecting the photocell C in circuit with a suitable amplifying tube of large current-carrying capacity that is connected in the main driving motor field circuit, whereby current changes from the photocell cause similar changes in the motor field circuit and result in changes in motor speeds. Other modifications may be made in the details of the disclosed methods and mechanisms without departing from the principles of our invention or sacrificing its advantages.

We claim:

1. The combination of means for locally heating material; mechanism for causing continuous relative movement of said material and such heating means to locally heat successive portions of said material; and means, comprising a device responsive to variations from a predetermined thermal condition of such successive locally heated portions, for controlling such mechanism to vary the rate of relative movement of said material and such heating means, said device comprising a photoelectric cell sensitive to variations in radiant energy emitted by each successive locally heated portion of such material.

2. The combination with a source of heat adapted to be concentrated on relatively small areas of metal work, of mechanism for moving said work relatively to said source of heat for heating successive small areas of the work, optical means responsive to variations in a thermal condition of such successive small heated areas of said work, and means whereby said mechanism may be controlled to vary such relative movement in accord with the operation of such responsive means.

3. The combination with mechanism whereby heat may be progressively applied locally to successive portions of work, of photoelectric means responsive to variations in radiant energy emitted by each successive locally heated portion of said heated work, and means operatively associated with said photoelectric means and controlling said mechanism.

4. The combination with mechanism whereby a heating flame may be progressively applied to metal work to heat successive portions thereof, of means operatively connected with said mechanism for regulating the same to control the quantity of heat applied to such successive portions, such regulating means comprising photoelectric means responsive to variations in radiant energy emitted by successive heated portions of the work.

5. The combination with mechanism whereby heat may be progressively applied to work to produce a weld or a cut, of means whereby said mechanism is adapted to be controlled in accord with radiant energy variations occurring at or near the weld or the cut as it progresses.

6. The combination with mechanism whereby heat may be progressively applied to metal work in producing a weld or a cut, of photoelectric means for controlling said mechanism in response to changes in radiant energy emitted by the metal at such weld or cut.

7. The combination with a source of heat adapted to be applied to work, of mechanism for moving a portion of such work past and in heating proximity to said source of heat to successively heat parts of the work, a photoelectric cell mounted adjacent to the moving work and responsive to changes in the radiant energy emitted by such successive parts when they are heated, means actuated by the current variations in said cell corresponding to said changes, and a regulating device operatively associated with said mechanism for varying the movement of said work in accord with the actuation of said means.

8. The combination with flame-producing means for locally heating work; of mechanism for causing continuous relative movement of said work and such heating means for locally heating successive parts of said work; means adapted to detect and indicate variations in a thermal condition of said successively heated parts; and automatic means for controlling said mechanism in accord with such indications to vary the rate of relative movement of said work and said heating means.

9. In a welding or cutting machine, the combination of means adapted to apply high-temperature heat to a metal article; mechanism operable to feed said article past such means to progressively heat and weld or cut a portion of said article; and means whereby said mechanism may be semi-automatically or automatically regulated in response to variations in a characteristic of the successive highly heated parts to vary the feeding speed of said article.

10. In a welding machine or the like, the combination of means adapted to apply welding heat to an article; variable speed mechanism operable to move said article past such means to progressively heat and weld a portion of said article; a device stationary relatively to said moving article and adapted to detect variations, from a predetermined value, of a characteristic of the successively heated parts; and means adapted to regulate said mechanism in accord with the variations detected by said device.

11. A welding machine or the like according to claim 10, wherein said device comprises photoelectric means in which the photoelectric current varies with changes in radiant energy emitted from the successively heated parts.

12. A welding machine according to claim 10, wherein said device comprises a photocell in which the photoelectric current varies with changes in radiant energy emitted from the successively heated parts, and such means adapted to regulate said mechanism comprises means to amplify the photoelectric current, and relay means adapted to be actuated by such amplified current.

13. A welding machine comprising the combination of means, such as an oxy-acetylene blowpipe or an electric arc, for producing welding heat; mechanism, including a variable-speed electric driving motor, for continuously feeding edges of metal work past such heating means to progressively fuse metal and produce a weld uniting such edges; a photocell associated with said heating means and focused on a point at or adjacent the weld where the metal is in a state of fusion, and adapted to detect changes from a predetermined normal welding condition; and means whereby resulting variations in said photocell serve to regulate said motor and the mechanism driven thereby and tend to maintain such normal welding condition.

14. In a welding machine, the combination of means for applying spaced preheating and welding flames along contiguous metal edges to be united; mechanism for moving said edges relatively to said flames in a direction lengthwise of said edges to progressively unite the latter; a photocell focused on a point between said preheating and said welding flames and responsive to variations in radiant energy emitted by the parts of said edges passing said point; and means whereby changes in said photocell corresponding to said variations serve to regulate said mechanism.

15. The combination with mechanism whereby heat may be progressively applied to work, of regulating means for said mechanism adapted to cause a quick change in heating effect, and additional means associated with said regulating means to cause a further subsequent change in heating effect of the same trend as effected by said regulating means.

16. The combination of mechanism whereby heat may be progressively applied to work, such mechanism comprising a variable speed electric driving motor; regulating means adapted to cause a quick change in the speed of said motor, and additional means associated with said regulating means to cause a further subsequent change of motor speed of the same trend as effected by said regulating means.

17. The combination of mechanism whereby heat may be progressively applied to work, such mechanism comprising a variable speed electric driving motor; photoelectric means responsive to variations in radiant energy emitted by the heated work; and regulating means controlled by said photoelectric means and adapted to cause a quick initial change in the speed of said motor followed by a regulated increasing change of the same trend.

18. Process which comprises progressively applying a heating flame to work to heat successive portions thereof, and varying the amount of heat applied to such successive portions as a thermal condition of said portions changes from a predetermined standard condition, such heat variations being proportional to such changes and constantly tending to reestablish said predetermined standard condition.

19. Process which comprises progressively applying a heating flame to work to heat successive portions thereof, and varying the amount of heat applied to successive portions of the work proportionally to changes in radiant energy emitted by successive heated portions of the work.

20. Process of welding, brazing or soldering a seam in metal work which comprises applying high-temperature heat progressively along the seam to be welded, brazed or soldered; and varying such heat proportionally to changes in radiant energy emitted by highly-heated metal along the seam.

21. Process of welding or cutting which comprises progressively heating the work; and varying the heat applied to the work proportionally to radiant energy changes occurring at or near the weld or the cut.

22. Process of welding a metal seam which comprises progressively applying welding heat and melting metal along said seam, and varying the welding heat proportionally to radiant energy emitted by such melted metal.

23. Process of welding contiguous metal edges which comprises progressively melting portions of said edges, and varying the heat applied to said edges proportionally to changes in radiant energy emitted by molten portions of said edges.

24. Process of welding contiguous metal edges which comprises progressively preheating said edges to slightly melt them; progressively applying welding heat to said edges after they have been preheated, to form a molten puddle and effect proper penetration of the welding; and varying the heat applied to said edges in accord with radiant energy changes occurring at or between the points to which said preheating and welding heat are applied.

25. The combination with mechanism whereby a localized high-temperature flame is progressively applied to successive parts of metal work, of means whereby radiant energy emitted by the successively heated parts of said work controls the quantity of heat applied by said flame to such successive parts of the work.

26. The combination with mechanism for progressively applying heat to metal work to produce a weld or cut, of means operatively associated with said mechanism for regulating the amount of heat applied to successive portions of the work to produce a weld or cut of a predetermined standard, such regulating means including an optical device adapted to be focused on or near the successive heated portions of the work and responsive to variations in radiant energy emitted by such heated work.

27. The combination of a blowpipe adapted to produce a high-temperature flame for locally heating a portion of metal work, means for moving said blowpipe and said work relatively to one another for locally heating successive portions of said work, and photo-electric means responsive to changes in radiant energy emitted by such successive portions when they become heated for controlling such moving means.

28. Process of welding or cutting metal work, which comprises locally and progressively applying gaseous heating and oxidizing agents to and along such work to produce a weld or a cut, and varying the application of such agents in response to changes in radiant energy emitted from a heated portion of the work adjacent the welding point or cutting point.

29. Process of welding or cutting metal work which comprises applying gaseous heating and oxidizing agents locally to such work; moving said heating and oxidizing agents and said work relatively to one another to progressively weld or cut such work; and varying such movement in response to changes in radiant energy emitted from a heated portion of the work adjacent the welding point or the cutting point.

30. Process which comprises progressively and locally applying heat to successive portions of metal work, such heat being applied to one surface of said work, and controlling the amount of heat so applied in accordance with changes in radiant energy emitted by heated portions of the opposite surface of the work.

31. The combination of means for applying heat locally to one surface of metal work, means for moving said work and such heating means relatively to one another for locally heating successive portions of said work, and means including a device disposed adjacent the opposite surface of said work and responsive to radiant energy emitted by each successively heated portion for controlling said moving means to vary the rate of relative movement of such work and said heating means.

32. The combination of means for applying a localized high-temperature heating flame to a metal body; mechanism for causing continuous relative movement of said body and such heating flame to progressively and locally heat successive portions of said body; and means, comprising a device responsive to variations of a thermal condition of each successive locally heated portion, for controlling said mechanism to vary the rate of relative movement of said body and such heating flame.

33. The combination of means for progressively applying a localized high-temperature heating flame to successive portions of a body; and mechanism, comprising a device responsive to variations of a thermal condition of each successive locally heated portion of said body, for controlling the quantity of heat applied by such heating flame.

34. The combination of means for locally heating successive portions of a metal body; and mechanism, including a photoelectric cell responsive to radiant energy emitted by such portions when so heated, for controlling such heating.

35. The combination of means for applying a localized high-temperature heating flame to successive portions of a metal body; mechanism for moving such heat applying means and said body relatively to one another and means, including a device responsive to radiant energy emitted by heated portions of said body, for controlling the quantity of heat so applied to said body.

36. The combination with a localized source of high-temperature heat adapted to be applied to a metal body and capable of raising successive parts of said body to a state of fusion; of mechanism for continuously moving said body past and in heating proximity to said source of heat to heat successive parts of said body to a state of fusion; and means for either semi-automatically or automatically regulating said mechanism in response to variations of a thermal condition of such successively heated parts.

37. A welding process which comprises relatively moving metal work and flame means for locally heating successive parts of such work, and continuously controlling such relative movement in response to changes in radiant energy emitted by such successively heated parts.

38. Process which comprises applying high-temperature heat locally and progressively to successive portions of one surface of metal work to heat intensely and locally, by conduction through said work, successive portions of the opposite surface of said work, and regulating the amount of heat so applied in accordance with variations in radiant energy emitted by the thus-heated successive portions of said opposite surface.

JAMES H. BUCKNAM.
LLOYD W. YOUNG.

CERTIFICATE OF CORRECTION.

Patent No. 2,089,014.               August 3, 1937.

JAMES H. BUCKNAM, ET AL.

It is hereby certified that error appears in the printed specification of the above numbered patent requiring correction as follows: Page 1, first column, line 42, for "thereto" read thereby; page 6, first column, line 67, claim 5, after the word "to" first occurrence, insert metal; and that the said Letters Patent should be read with these corrections therein that the same may conform to the record of the case in the Patent Office.

Signed and sealed this 12th day of October, A. D. 1937.

Henry Van Arsdale.
Acting Commissioner of Patents.

(Seal)